Figure 5:
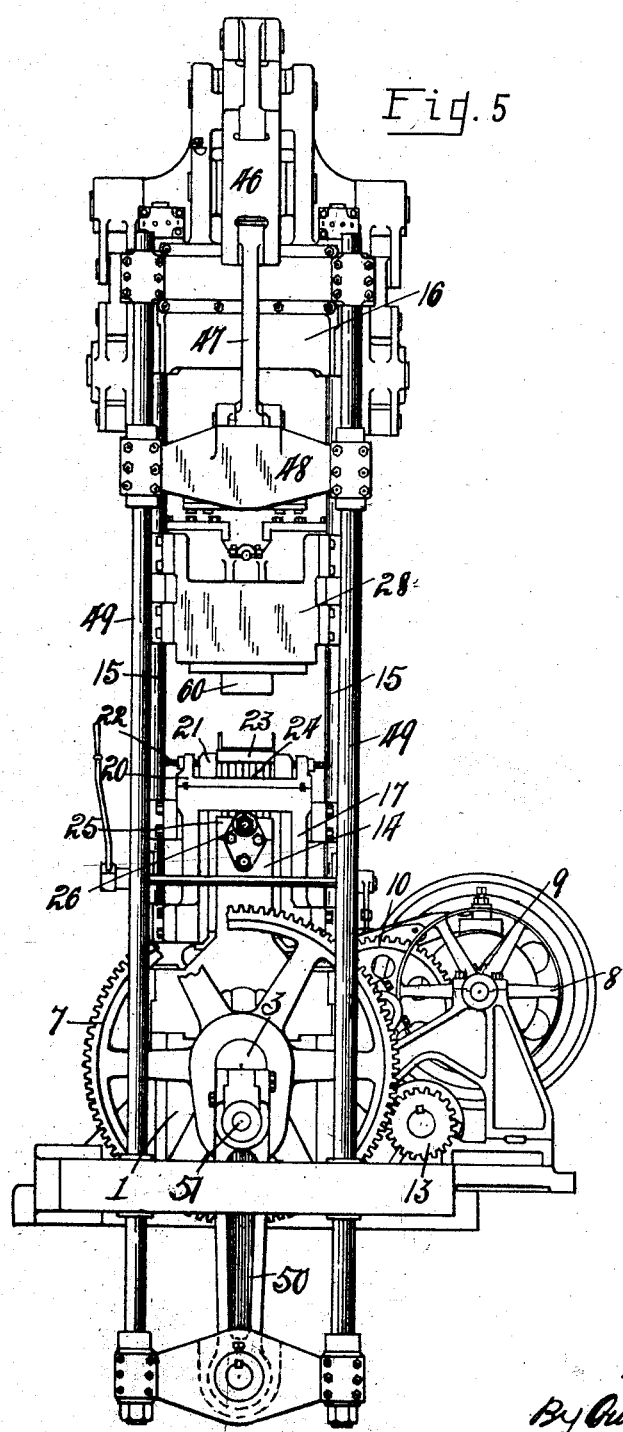

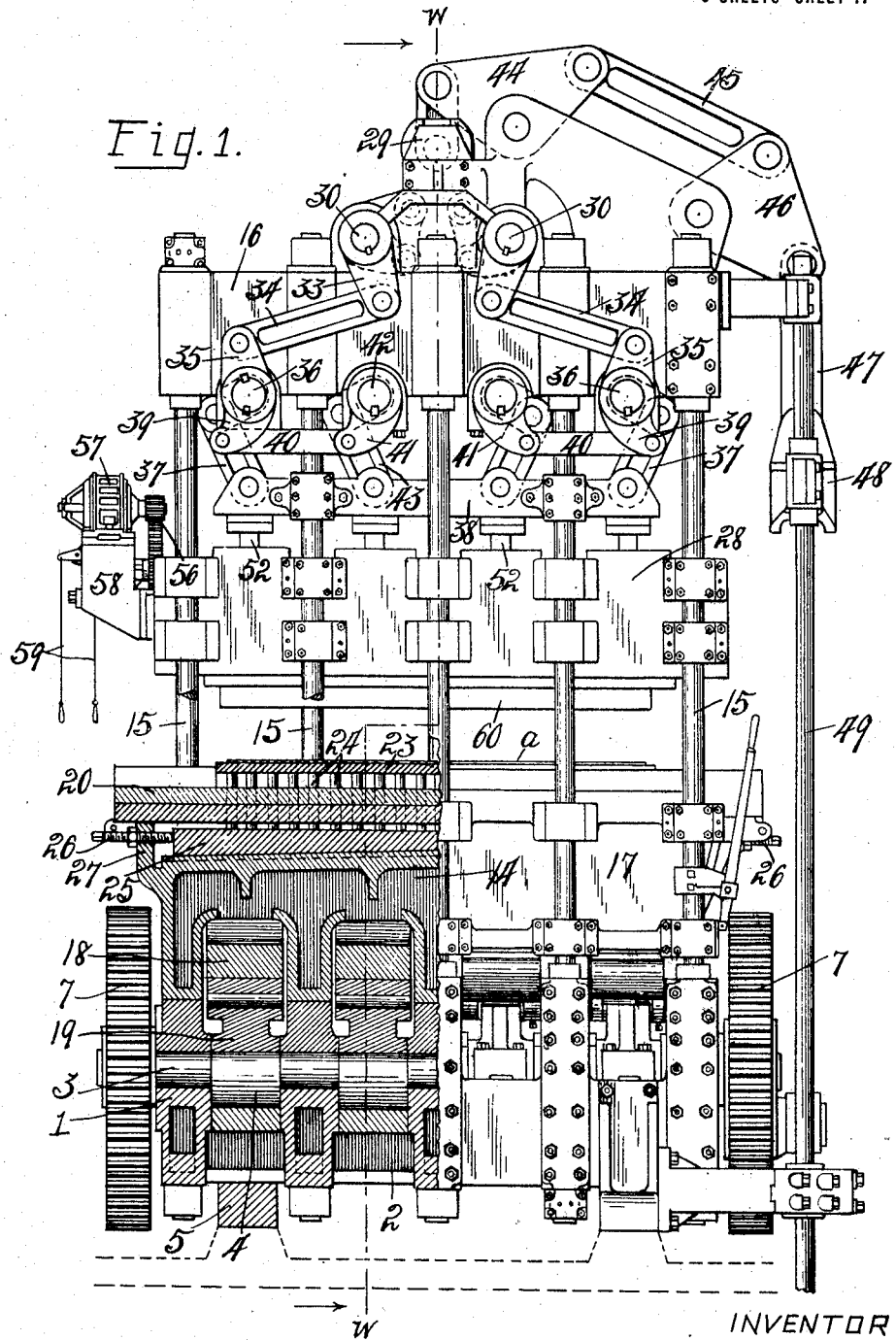

H. J. HINDE.
DRAWING PRESS.
APPLICATION FILED OCT. 27, 1915.
1,176,897.
Patented Mar. 28, 1916.
9 SHEETS—SHEET 2.
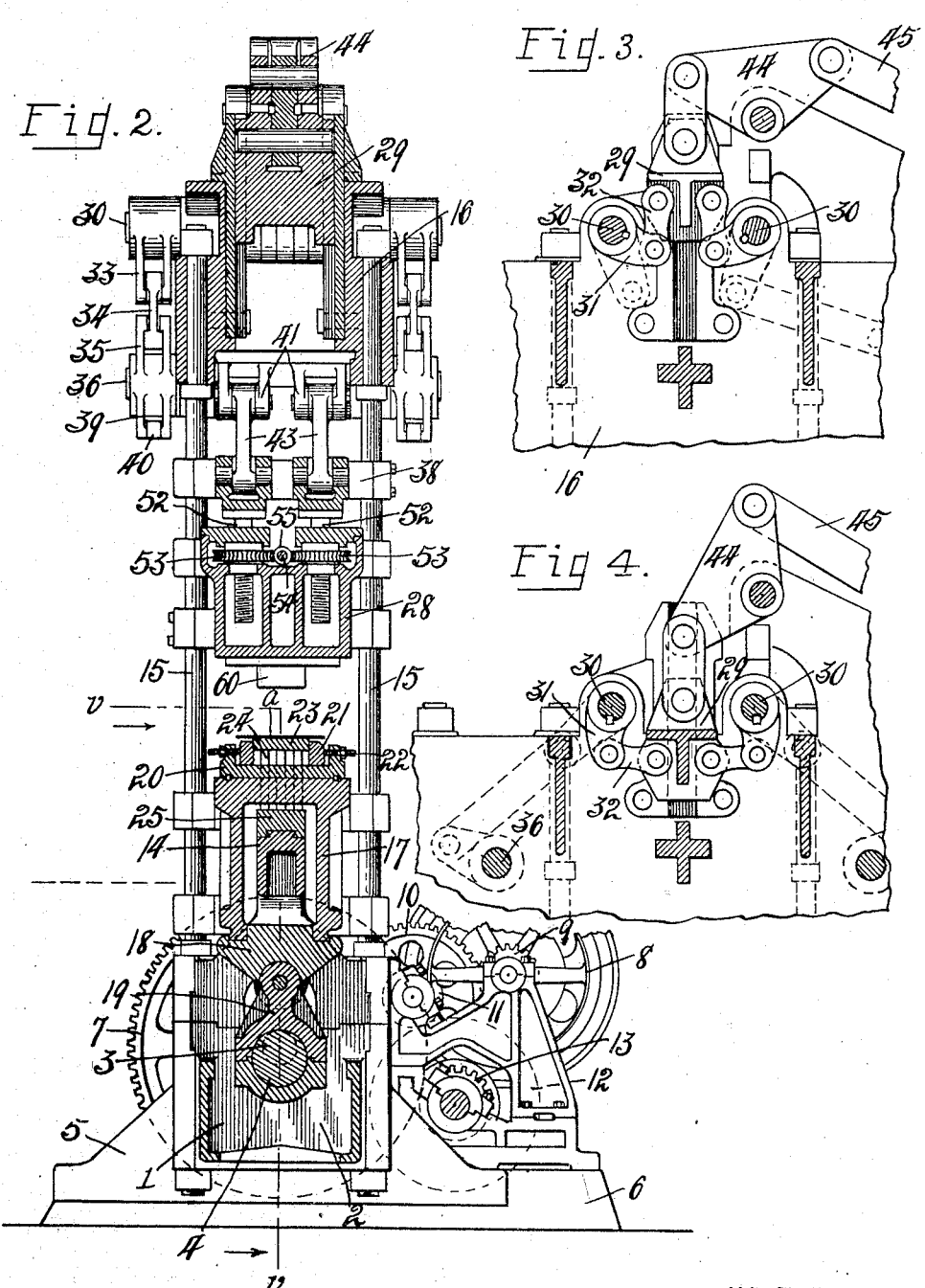
INVENTOR.
Henry J. Hinde,
By Owen, Owen & Crampton,
His attys.

H. J. HINDE.
DRAWING PRESS.
APPLICATION FILED OCT. 27, 1915.

1,176,897.

Patented Mar. 28, 1916.
9 SHEETS—SHEET 3.

INVENTOR.
Henry J. Hinde,
By Owen, Owen & Crampton,
His attys.

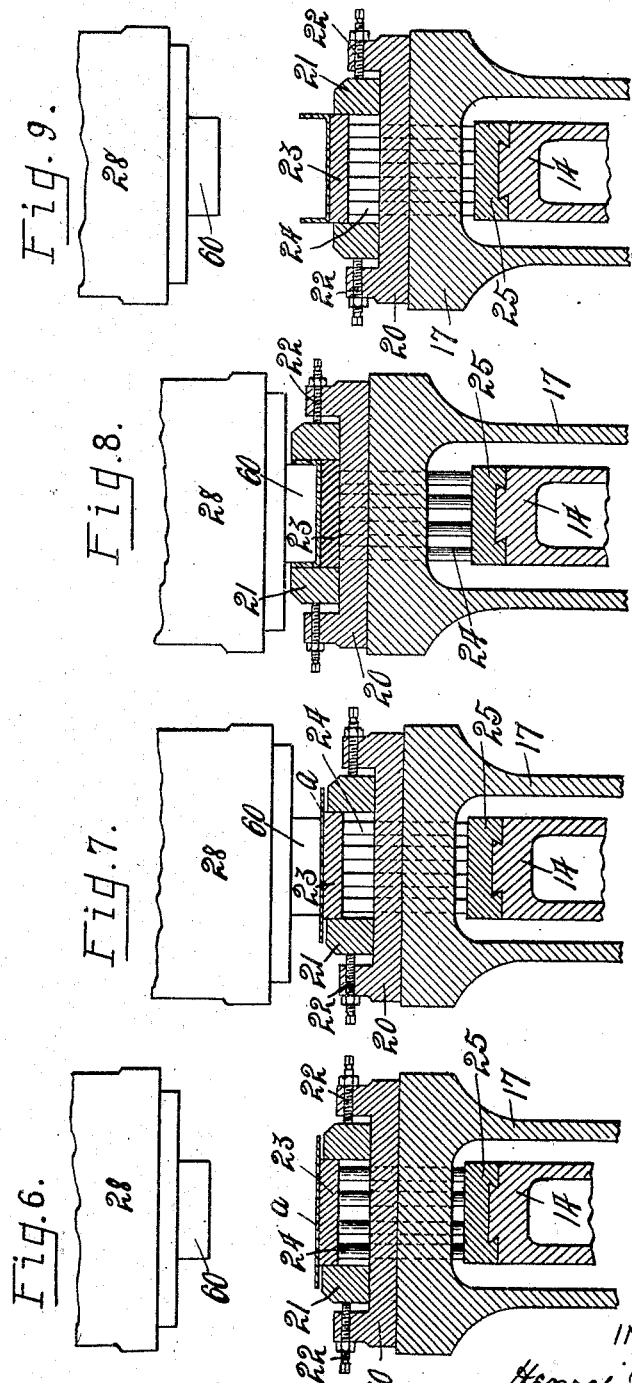

H. J. HINDE.
DRAWING PRESS.
APPLICATION FILED OCT. 27, 1915.

1,176,897.

Patented Mar. 28, 1916.
9 SHEETS—SHEET 5.

INVENTOR
Henry J. Hinde,
By Owen, Owen & Crangton
his attys

H. J. HINDE.
DRAWING PRESS.
APPLICATION FILED OCT. 27, 1915.

1,176,897.

Patented Mar. 28, 1916.
9 SHEETS—SHEET 7.

INVENTOR.
Henry J. Hinde,
By Owen, Owen & Crampton
His attys.

H. J. HINDE.
DRAWING PRESS.
APPLICATION FILED OCT. 27, 1915.

1,176,897.

Patented Mar. 28, 1916.
9 SHEETS—SHEET 8.

INVENTOR.
Henry J. Hinde,
By Owen, Owen & Crampton.
His attys.

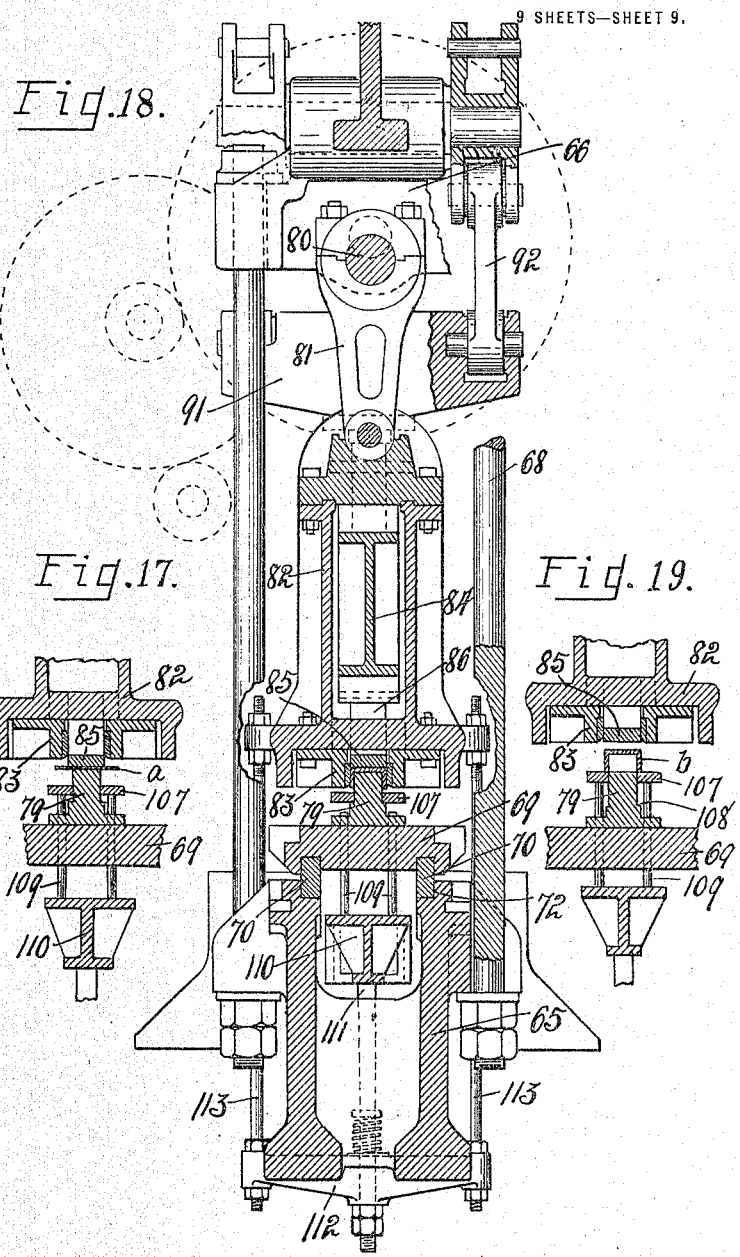

UNITED STATES PATENT OFFICE.

HENRY J. HINDE, OF TOLEDO, OHIO, ASSIGNOR TO THE TOLEDO MACHINE & TOOL COMPANY, OF TOLEDO, OHIO, A CORPORATION OF OHIO.

DRAWING-PRESS.

1,176,897.  Specification of Letters Patent.  Patented Mar. 28, 1916.

Application filed October 27, 1915. Serial No. 58,236.

*To all whom it may concern:*

Be it known that I, HENRY J. HINDE, a citizen of the United States, and a resident of Toledo, in the county of Lucas and State of Ohio, have invented a certain new and useful Drawing-Press; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to drawing presses and particularly to the type of press in which the blank holder precedes the work shaping member in its engagement of the blank and then dwells or pauses in its movement and firmly holds the blank during the shaping operation. In the use of machines of this character it has been the universal practice, so far as I am aware, to grip the blank at its edges and to then cause a punch or male die to force the central or free portion of the blank into a registering matrix to impart the desired shape thereto. The acting on the blank in this manner causes a buckling thereof and prevents the forming of absolutely smooth and perfect work. Numerous endeavors have been made to overcome this objectionable feature, but none so far as I am aware have been successful.

The primary object of my invention is to completely overcome the objections above noted by providing means in a press of this character for gripping a blank at the central portion thereof, or interiorly of the line of coaction of the matrix die therewith, prior to the shaping operation, and firmly and positively holding the blank during such operation, whereby to enhance the practicability and commercial value of machines of this class.

A further object of my invention is the provision of simple and improved means for adjusting the blank holder slide with respect to the die whereby such adjustment can be effected in an easy, quick and efficient manner.

Further objects and advantages of the invention will be apparent from the following detailed description thereof.

While the invention in its broader aspect is capable of embodiment in numerous forms, a preferred and one modified form only thereof are illustrated in the accompanying drawings, in which—

Figure 10:
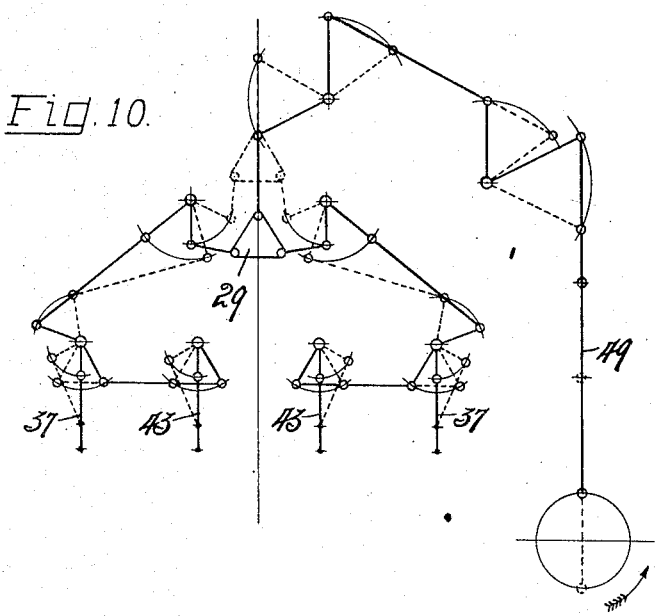
Figure 11:
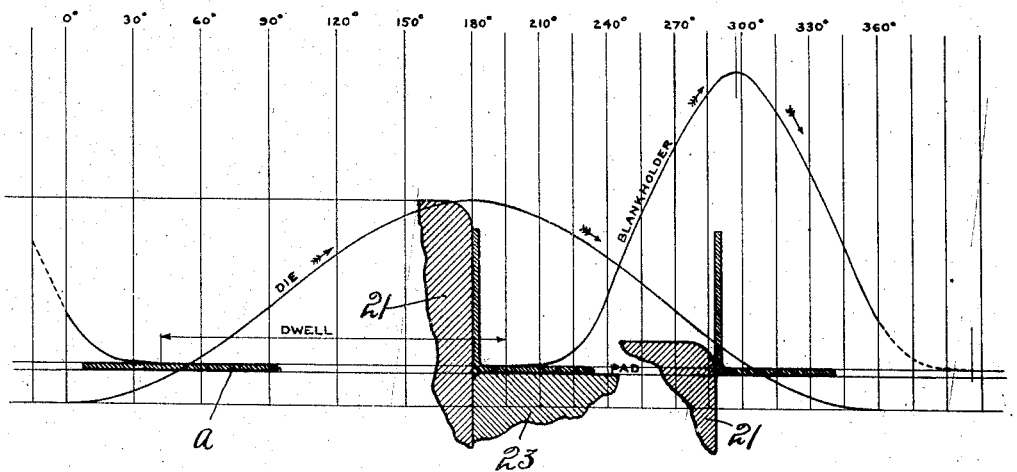
Figure 12:
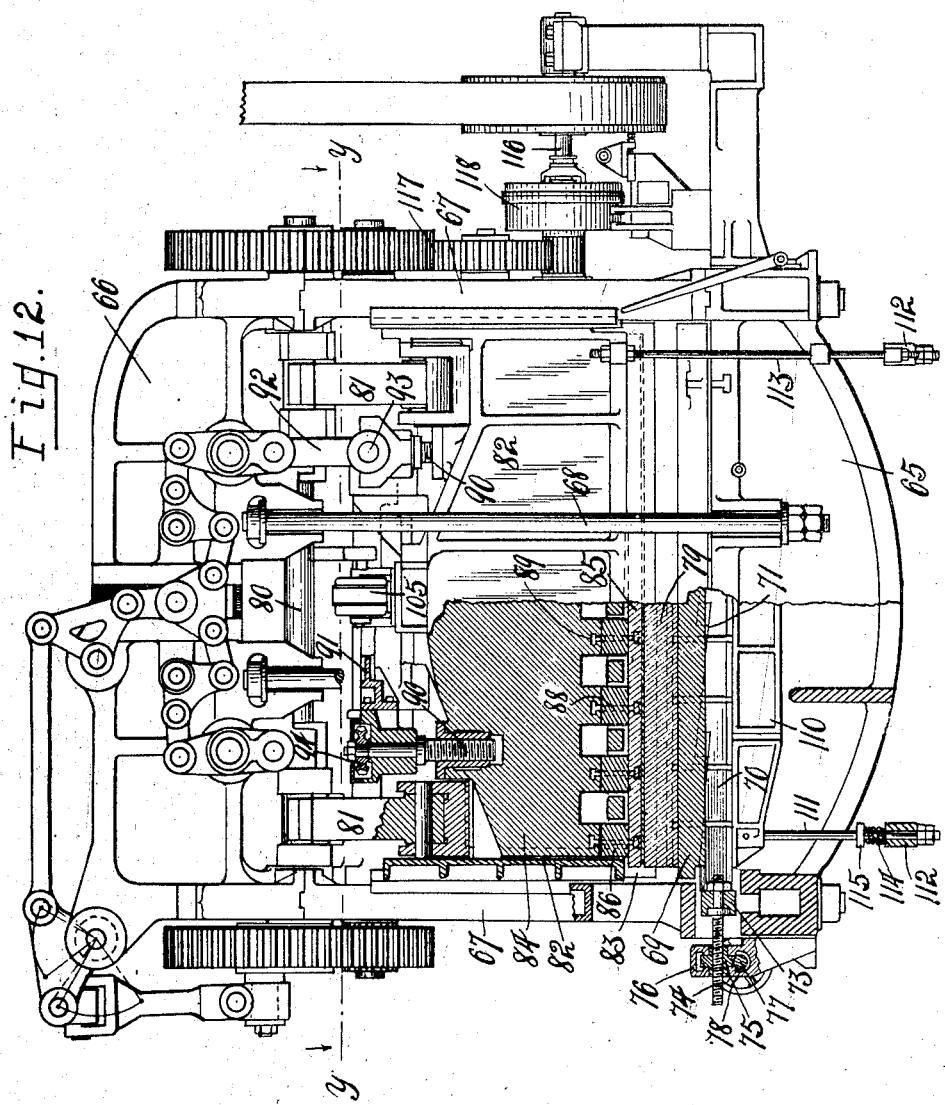
Figure 13:
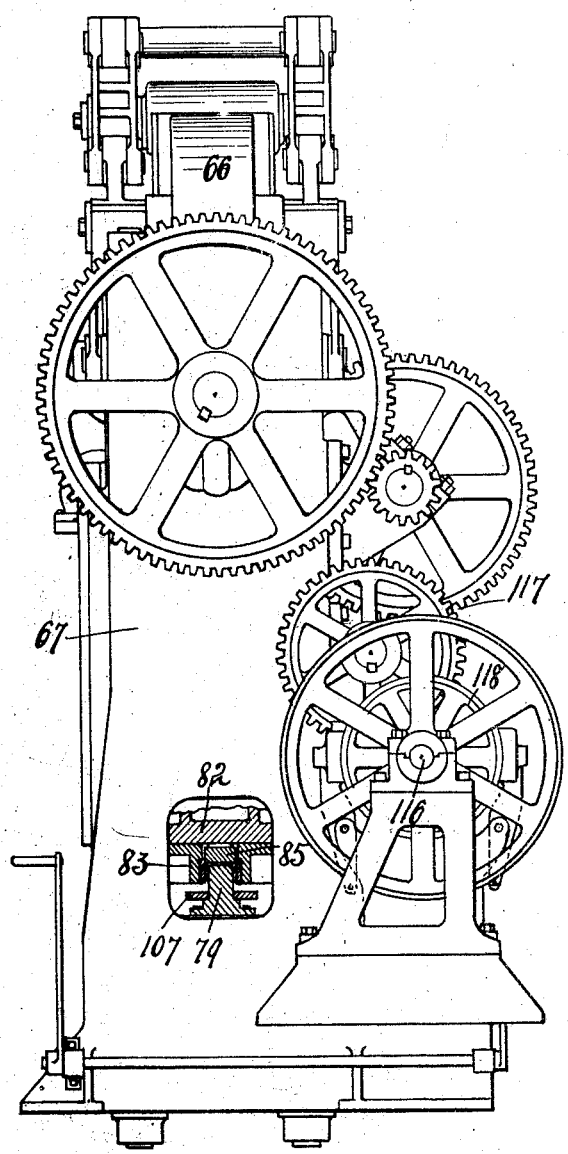
Figure 14:
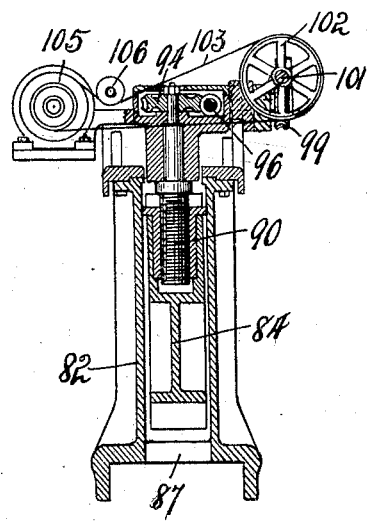
Figure 15:
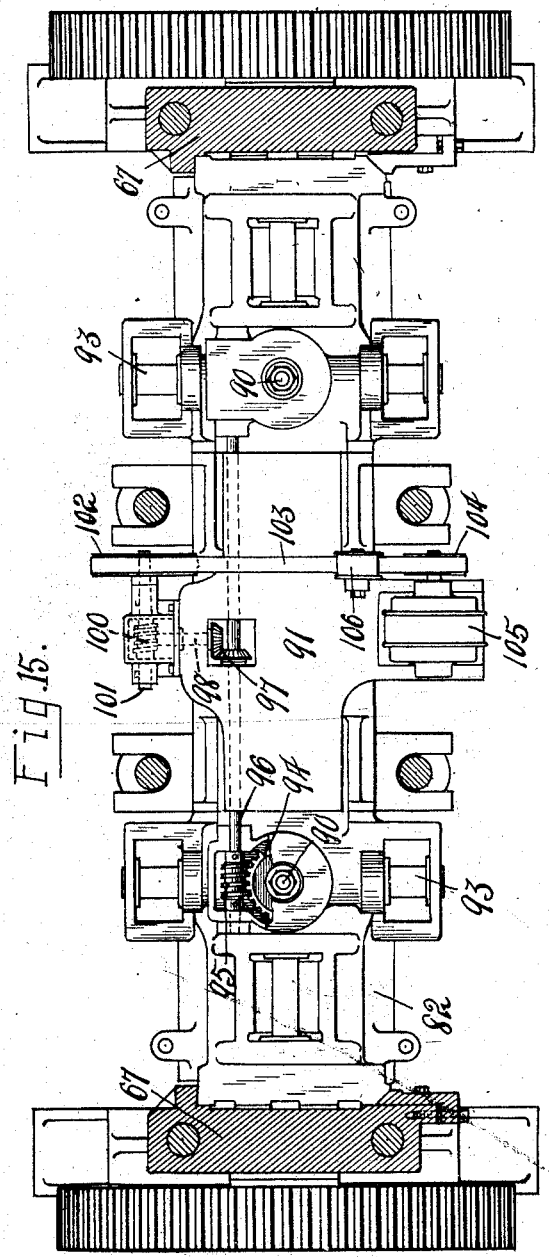
Figure 20:
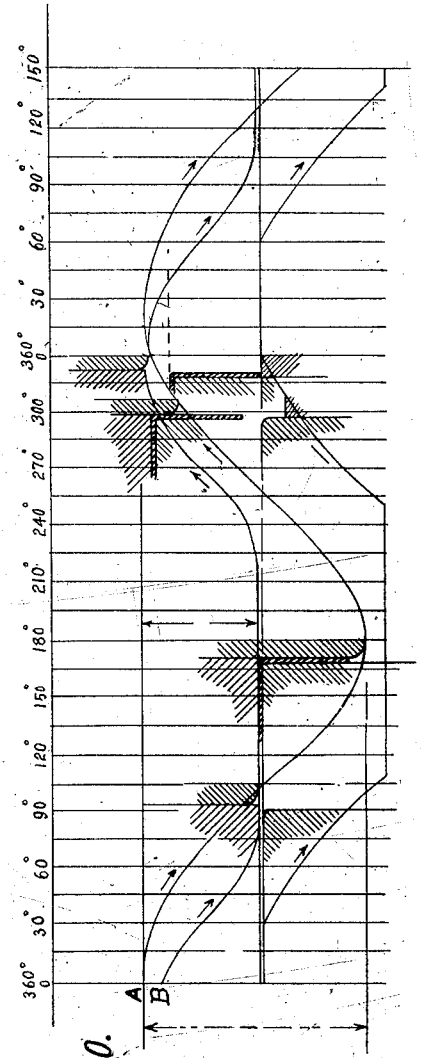

Figure 1 is a front elevation of a machine embodying the invention with parts in central vertical section on the line $v, v$ in Fig. 2. Fig. 2 is a vertical section of the machine on the line $w, w$ in Fig. 1, with parts broken away. Figs. 3 and 4 are sectional details of portions of the toggle mechanism for controlling the movements of the blank holder slide. Fig. 5 is a side elevation of the machine with parts broken away. Figs. 6, 7, 8 and 9 are views of the blank holding and shaping parts with portions in section and illustrating the relative positions of said parts at four different successive points in a cycle of operations. Fig. 10 is a diagrammatical view of the toggle mechanism employed to control the movements of the blank holder slide. Fig. 11 is a diagram of the relative movements of the blank holder slide and forming die during a cycle of operations. Fig. 12 is an elevation of a press embodying a modified form of the invention. Fig. 13 is a side view thereof. Fig. 14 is a fragmentary section of the slides. Fig. 15 is a section on the line $y, y$ in Fig. 12 with parts broken away. Figs. 16, 17, 18 and 19 are sectional fragmentary views of the work gripping and shaping parts of the machine illustrating the successive relative positions of such parts during a cycle of operations. Fig. 18 being more in detail, and Fig. 20 is a diagram of the relative movements of the work gripping and shaping parts.

Referring to Figs. 1 to 11 of the drawings, 1 designates the base of the machine frame, which is provided with a plurality of longitudinally spaced crank chambers 2 and has a crank shaft 3 mounted lengthwise therein and provided within each chamber 2 with a crank or eccentric portion 4. The base 1 is provided with longitudinally spaced foot portions 5, for mounting on a suitable foundation 6. A spur-gear 7 is mounted on each end of the crank-shaft 3 without the respective end of the base frame and may be driven by any suitable driving mechanism. The mechanism illustrated in the present instance for driving the gears 7 comprises a pulley 8 from which a belt may extend to any suitable source of power; a small gear 9 s mounted on the shaft with the pulley 8 and meshes with and drives a larger gear 10, on the shaft with which is a small gear 11, which in turn meshes with and drives a larger gear 12; on the shaft with the gear 12 are small gears 13, which mesh with and drive the gears 7 on the crank shaft. It is evident that this combination of gearing communicates a very powerful driving action to the crank shaft gears 7 from the pulley 8.

Mounted on the base 1 of the frame is a bed 14, which extends over the tops of the crank chambers 2 and is supported at intervals intermediate its ends by downwardly projecting leg portions, which rest on the top of the base at the sides of said chambers, as best shown in Fig. 1. The top portion of the bed 14, while extending throughout the length of the frame base 1 is narrowed in width and disposed centrally of the side edges of said base, as best shown in Fig. 2. The base 1 and bed 14 are secured together by vertical tie-rods 15, a plurality of which are disposed at each side thereof and extend upward therefrom and support a frame head 16.

The main or bottom slide of the press is designated 17 and is guided for vertical reciprocatory movements by the tie-rods 15 with which it has sliding engagement. This slide is of inverted U-shape in cross-section to adapt it to straddle the narrowed top portion of the bed 14, and has its legs resting at their lower ends on blocks 18, one of which is disposed in the upper portion of each crank chamber 2 of the base and is pivotally carried by a pitman 19 that is mounted on the respective crank portion 4 of the crank shaft 3. It is thus evident that a turning of the crank shaft 3 will cause vertical reciprocatory movements to be imparted to the main slide 17 relative to the bed 14.

A die-shoe 20 is mounted on the top of the slide 17 and in turn removably carries a matrix die 21. The die 21 is held properly positioned on the die shoe 20 by set screws 22, which thread through upwardly extending side flanges of the shoe and engage the respective sides of the die. The die 21 preferably has the cavity thereof extending entirely therethrough so that the bottom of the opening is closed by the die-shoe.

23 designates the blank supporting pad which is of suitable size to fit the cavity of the matrix die and to have vertical movements therein, the pad forming the bottom proper of the die cavity when the die is raised relative thereto.

The pad 23 is supported in stationary position relative to the press frame by a plurality of pins or supports 24, which rest at their lower ends on the top of the bed 14 and extend upward therefrom through registering openings in the slide 17 and die-shoe 20. The pins 24 are of suitable length to support the upper edge of the pad 23 slightly above the upper edge of the die 21 when the slide 17 is at the limit of its downward movement, as indicated in Figs. 1, 2, 6, 7 and 9 and the upward movement of the slide is the same in length as the maximum projection of the pins 24 above the die-shoe 20, as is apparent by reference to the figures.

To facilitate an accurate adjustment of the pins 24 relative to the die a wedge-member 25 is adjustably mounted on the top of the bed 14 in position to support or receive the downward thrusts of the pins 24. This wedge member has its bottom, in the present instance, in dove-tailed engagement with the top of the bed for sliding movements lengthwise thereof, and has its top surface level, while its bottom surface and the top edge of the bed are tapered in complemental relation, whereby a longitudinal movement of the wedge member in either direction will effect a vertical adjustment of the pins 24. An adjustment of the member 25 is effected by a turning of screws 26, which thread through ears 27 rising from the respective ends of the bed 14 and have their inner ends thrust against the respective ends of the wedge member, as shown in Fig. 1. It will, of course, be understood that the form of the die 21 and manner of mounting the same on the main slide may be changed as desired, and also that the form of the pad 23 may be changed as desired, or as the work to be performed may require, the construction shown being merely illustrative of one form of the invention.

The upper or blank-holder slide 28 is guided for vertical reciprocatory movements above the main slide 17 and parts mounted thereon by the tie-rods 15, and has its movements controlled, in the present instance, by a toggle mechanism similar to that described in Patent No. 1,089,558, dated March 10, 1914, said mechanism being connected to and guided by the crank shaft 3. This mechanism briefly described comprises a slide block 29, which is mounted in suitable guide ways provided in the upper central portion of the frame head 16 for vertical sliding movements relative thereto, as best shown in Figs. 3 and 4. Mounted in the frame head at opposite sides of the block 29 is a pair of transverse shafts 30, each having an arm 31 projecting therefrom and connected to the respective side of the slide block by a link 32. At the ends of each shaft 30, without the frame head, are provided crank arms 33 which are respectively connected by outwardly extending links 34 to crank-arms 35 projecting upward from the respective ends of rock shafts 36, which are mounted in the end portions of the frame head 16 at the under side thereof. Each shaft 36 has toggle arm and link connection 37 with a subjacent vertically movable frame 38, and also has an arm 39 in connection through a link 40 with a similar arm 41 on a shaft 42, whereby the shafts 36 and 42 are caused to have like rocking movements in unison. The shafts 42 have toggle-link connection with the frame 38, the same as the shafts 36, as shown at 43. The provision of the shafts 42 and their connection with the frame 38, in addition to the shafts 36 and their connection with said frame causes an equalizing of the pressure on the frame 38 throughout its length. The slide block 29 has its upper end in link connection with a bell-crank type of lever 44, which is in turn connected by a link 45 to a second bell-crank lever 46, both of which levers are fulcrumed to a portion of the frame head 16, and the lever 46 has a link 47 projecting downward therefrom at one end of the press frame and connecting to a cross head 48, which is in turn connected by a yoke 49 to a crank rod 50 projecting downward from a crank 51 on the adjacent end of the crank-shaft 3.

The frame 38 adjustably carries the blank-holder slide 28 and for such purpose has a plurality of stems 52 projecting downward therefrom and into the blank-holder slide and threaded through worm-wheels 53 mounted in said slide, as shown in Fig. 2. The worm-wheels 53 coöperate with the stems 52 to carry the slide 28 and also coöperate therewith to communicate downward pressure to the slide from the frame 38 when it is lowered by a straightening of the toggles 37 and 43. The worm-wheels 53 are arranged in two sets which are spaced transversely of the slide, and projecting between these sets lengthwise of the slide is a shaft 54 carrying worms 55 for opposite engagement with the worm-wheels between which they are disposed, whereby a turning of the shaft 54 communicates reverse rotation to the worm wheels at opposite sides thereof. As the sets of worm-wheels are driven in opposite directions the threads on the stems 52 of one set are of the right hand type and those on the other set of the left hand type. The shaft 54 projects without one end of the slide 28 and has geared connection, as at 56, with the shaft of a motor 57, which, in the present instance, is of the electric type. This motor is carried by a bracket 58 projecting from one end of the slide 28.

59 designates the switch controlling cords of the motor.

The slide 28 carries a blank holder 60 at its under side, which, when lowered, coacts with the pad 23 to firmly grip a work blank $a$ therebetween. The blank-holder 60, in addition to serving in conjunction with the pad 23 as a means for gripping and firmly holding the blank during the forming operation, also serves as the male forming die and is therefore of suitable size and shape to enter the matrix die 21, allowance being made for the thickness of the material forming the blank.

The operation of this form of my invention is as follows: The matrix die 21 having been secured to the die-shoe 20 and a blank of a gage equal to that of the work to be operated on placed on the pad 23 the blank-holder slide 28 is lowered to the limit of its down stroke and the motor 57 then operated to effect the desired adjustment of the slide relative to the work. This having been done the adjustment is completed by a turning of the screws 26 to effect the desired adjustment of the wedge member 25 and pad holding parts. The blank holder slide is then raised to the normal at rest position shown in Figs. 1, 2, 5, 6 and 9. The successive positions of the blank holding and shaping parts during the cycle of operations of the press are illustrated in Figs. 6, 7, 8 and 9 and also by the diagram shown in Fig. 11. During each cycle of operations the blank holder slide 28 is first lowered to place the blank holder 60 in firm gripping contact with the work blank $a$ in opposition to the pad 23, the actuating mechanism for the blank holder then causing the blank holder to stand at rest or to dwell during approximately 155° of a revolution of the crank shaft 3, as shown by the diagram in Fig. 11. The movement of the bottom slide 17 is such that it will not have risen sufficiently for the matrix die 21 to have contact with the blank until the blank-holder 60 has lowered into gripping contact with the blank, the blank-holder then remaining in holding contact with the blank or standing at dwell until the bottom slide 17 has completed its up-stroke, during which stroke the matrix-die 21 moves up around the blank-holder 60 and shapes the edges of the blank thereto, as indicated in the diagram and also in Fig. 8. This having been done the bottom slide 17 first begins to lower or to recede and the raising of the blank-holder immediately follows, as indicated in the diagram. The lowering or recession of the matrix-die 21 relative to the pad 23 causes an ejection of the work from the matrix die, as shown in Fig. 9, thereby facilitating a removal of the work from the press. It is apparent that the firm gripping of the bottom of the work between the blank holder and pad prevents the buckling of the work which is occasioned by a marginal gripping of the blank and enables the edge portions of the blank to be shaped around the blank holder or male die without disturbing the position of the central portions of the blank.

In the modification of the invention illustrated in Figs. 12 to 20, 65 designates the base of the machine frame which is mounted in any suitable manner on a supporting foundation (not shown) and 66 the frame head, which is connected to and rigidly supported by the frame sides 67. Said base and frame parts are also connected by a plurality of bolts or tie rods 68. A bedplate 69 is mounted on the top of the base 65 and, in the present instance, is directly supported by a pair of adjusting strips 70, 70, which are disposed lengthwise of the base and rest in guide ways provided on the top of the base for longitudinal adjustment lengthwise thereof. The strips 70 have their tops formed with successive tapered surfaces which coact with corresponding oppositely disposed tapered surfaces on the under side of the bed-plate 69, as best shown at 71 in Fig. 12, whereby a longitudinal movement of the strips 70 relative to the bedplate effects a vertical adjustment thereof. The base 65, in the present instance, is shown as being of hollow form and the top edge of each side wall thereof is provided with a race or guide-way 72 for one of the adjusting strips 70. The adjusting strips 70, 70 are connected at one end by a cross-bar 73, outwardly from which projects a rod 74. A worm-wheel 75 is threaded on the outer end portion of the rod 74 and is mounted in a bracket 76 on the adjacent frame side in a manner to permit a turning of the wheel but to prevent axial movements thereof. It is thus evident that a turning of the worm-wheel 75 on the threaded rod 74 will effect an adjustment of the bed-plate supporting strips 70, 70 in one direction or the other depending on the direction of turning of the wheel. A worm-shaft 77 is mounted in the bracket 76 with its worm in mesh with the worm-wheel 75 and is provided at one end, without the bracket, with a hand control wheel 78. A male die 79 of any desired form is mounted on the top of the bed-plate 69.

In the present form of my invention the crank-shaft 80 of the press is mounted on the head of the press frame and, in the present instance, has a pair of cranks from which depend pitmen or connecting rods 81 that are pivotally connected to and carry the top die-carrying slide 82 of the press. This slide, which is hollow in form for the purpose hereinafter described, has its end working in suitable guides in the sides 67 of the press frame, whereby the slide is caused to have true vertical reciprocatory movements communicated thereto by the pitmen 81 when the crank shaft 80 is rotated, as is well understood in the art. The matrix die 83 of the press is carried by the slide 82 on the bottom or under side thereof in proper register with the male die 79.

A blank-holder slide 84 is mounted for free reciprocatory movements within the die carrying slide 82, being guided thereby, and carries a blank-holder pad 85 at its under side, said pad being movably disposed within the cavity of the matrix-die 83 and below the bottom portion of the die carrying slide 82 to which the matrix die is secured. The blank holder pad 85 is spaced from the bottom of the slide 84 by a plurality of blocks 86, which project up through registering openings 87 provided in the bottom of the die carrying slide 82. The pad 85 and spacing blocks 86 are rigidly secured to the bottom of the slide 84 by bolts 88, one of which is provided for each block 86, being projected therethrough and through the registering portion of the blank holder plate 85 and having its headed end anchored in a registering T-slot 89 provided in the bottom surface of the slide 84 transversely thereof. In some cases the blank holder pad 85 is not straight throughout its length but is provided with transverse curves or offsets to conform to the shape of the dies 79 and 83. It is therefore evident that the blocks 86 which are arranged to suit the form of the blank holder pad 85 may not be disposed in true alinement lengthwise of the slide 84 but may assume more or less of a zig-zag formation. Such arrangement of the blocks will necessitate a placing of the blocks in differentially spaced relation to the side edges of the slide 84 and in order to permit an adjustment of the blocks transversely of the blank holder for such purpose, the base of the blank holder is preferably broader than the blocks 86 to enable a greater or less transverse shifting of the blocks with respect to the slide.

The blank-holder slide 84 is directly carried by vertically disposed adjusting screws 90, two being provided in the present instance, which screws thread into the top portion of the blank-holder slide and are rotatably carried at their upper ends by a vertically movable head 91. This head is carried by a set of links 92, which are connected to pivot pins 93 on the head and form parts of a toggle mechanism which is carried by the top portion 66 of the press frame and is operatively connected to a crank at one end of the shaft 80. This toggle mechanism is in all essential details the same as that described in connection with Figs. 1 to 11 of the drawings, and will therefore not be described.

Each screw 90 carries a worm wheel 94 within a portion of the head 91, and each of said wheels is in mesh with a respective worm wheel 95 on a shaft 96 that is suitably journaled in the head 91 lengthwise thereof. The shaft 96 has bevel-gear connection, as at 97, with a short shaft 98 that is mounted on one side portion of the head 91 transversely thereof and carries a worm-wheel 99 at its outer end in mesh with a worm 100 on a shaft 101, which is mounted lengthwise of the head 91 in a bracket secured to one side thereof. The shaft 101 carries a belt pulley 102 which is connected by a belt 103 to a drive pulley 104 on the shaft of a motor 105. This motor, which is preferably of the electrical type, is mounted on the head 91 at one side thereof.

106 designates a tension pulley for the belt 103.

It is evident that an operating of the motor 105 will effect a turning of the screws 90 and a consequent adjustment of the slide 84 relative to the head 91.

A stripper plate 107 is mounted on the die 79 for vertical reciprocatory movements relative thereto, being provided with an opening through which the die projects, and when at its lowermost position relative to the die it rests on shoulders 108 provided on the sides of the die. The vertical movements of the stripper plate 107 are controlled by a plurality of pins 109 which rest at their lower ends on a beam or table 110 disposed within the hollow of the frame base 65 and project upward from said table through registering openings in the bed plate 69 in position to coact with the bottom of the stripper plate 107 at the respective sides of the die 79. The beam or table 110 is supported at its ends by rods 111 which rise from respective cross-bars 112 that are in turn supported beneath the base 65 by rods 113 depending from the respective sides of the die carrying slide 82, as best shown in Fig. 18. Each rod 111 is yieldingly supported by its cross-bar 112 by reason of the interposition of a coiled compression spring 114 between each bar and a shoulder or fixed collar 115 on the rod. It is thus evident that the movements of the stripper plate 107 are controlled primarily by the die carrying slide 82, and that the movements of the stripper plate correspond to the movements of the slide 82. The rising movements of the stripper plate 107 are so gaged with respect to the height of the male die 79 that the top surface of the stripper plate stands flush or approximately flush with the top of the die when the die carrying slide 82 is in its raised or inactive position, thus providing a broad surface on which the work blank $a$ may be positioned preparatory to a shaping of the same, as shown in Fig. 16.

While it will be understood that the crank shaft may be driven in any suitable manner it is driven, in the present instance, from a shaft 116 through a train of gears 117, said gears being connected to the shaft 116 through the medium of a control clutch 118.

The operation of this form of my invention is as follows: It will be understood that when the operating parts are in their normal or at-rest position the die carrying slide 82 and blank holder slide 84 will stand in their raised positions with the blank holder pad 85 at the outer end of the matrix cavity and the stripper plate 107 in substantially flush position with the top of the male die 79, as shown by the relative position of the work coacting parts in Fig. 16. When a work blank $a$ has been placed in position on top of the stripper plate 107 and die 79 and the operator has dropped the clutch 118 to effect a turning of the crank shaft 80 and an operating of the toggle mechanism, the slides 82 and 84 will be lowered with the slide 84 slightly preceding the slide 82 so that the blank holder pad 85 will grip the central portion of the blank $a$ in opposition to the male die 79 in advance of the engaging of the blank by the female die 83, as indicated by the relative position of the parts in Fig. 17. When the blank holder has reached such work gripping position it is caused to stand at rest or to dwell in its movement during the continued downward work shaping movement of the slide 82 and die 83. It will be understood that the dwell of the blank holder during the shaping of the work blank is caused by the toggle mechanism connection between the crank shaft 80 and blank holder slide. When the die carrying slide 82 has reached the limit of its down stroke the work shaping and holding parts stand in the relative positions shown in Fig. 18. By reference to the diagram in Fig. 20, the lines A and B of which indicate the movements of the die carrying slide 82 and blank holder 84, respectively, it will be apparent that the blank holder pad 85 slightly precedes the female die 83 in its engagement of the work, and that the die carrying slide 82 slightly precedes the blank holder slide 84 in the commencement of its upstroke. In other words the dwell of the blank holder slide 84 begins in advance of the point of engaging of the work blank by the female die and continues until after the female die has completed its down stroke and started on its up stroke. On the up stroke of the die carrying slide 82 the pin carrying beam 110 is raised therewith and effects a consequent raising of the stripper plate 107 and a lifting of the shaped article $b$ from engagement with the male die 79 to facilitate a removal of the work from the press.

It is evident that with both forms of the invention which I have illustrated and described, the work is centrally gripped between two blank holding or gripping parts, which remain at rest during the work shaping movement of a female die, the only difference being that the position of the male and female dies in the two forms is transposed and that such transposition necessitates a changing and rearranging of the other work coacting parts. For instance, in the form of the invention illustrated in Figs. 1 to 11, both the male and female dies have opposed sliding movements in the press frame and the pad 23 serves in opposition to the male die to hold the work at dwell; while in the last form described the male die 79 is stationary and the female die 83 and blank holding pad 85 are movable. In other words, the male die 79 in this form assumes the stationary position of the blank holding pad 23 in the first mentioned form and the female die and blank holding pad are the movable parts and both are disposed above the male die and operated by an overhead operating mechanism.

It is also evident that with both forms of the invention the work blank is firmly gripped at its central portion in spaced relation to its edges and held stationary against vertical movements and also against a warping or buckling action while the edges thereof are being shaped by the female die. This is an especially important feature, for with the forms of presses in which the blank is gripped and held stationary at its edge portion by the blank holding parts, the center of the blank, in being driven into the cavity of the female die, is more or less buckled and warped and in some cases to such an extent as to prevent the formation of perfect work.

While I have herein shown and described two specific embodiments of my invention for illustrative purposes, and have disclosed and discussed in detail the construction and arrangement incidental to two specific applications thereof, it is to be understood that the invention is not limited to the mere detail or relative arrangement of the parts, but that deviations from the illustrated form or improvement of the invention may be made without departing from the spirit of the claims.

Having thus described my invention, what I claim as new, and desire to secure by Letters Patent, is,—

1. In a drawing press, means operable to grip the central portion of a work blank and hold it stationary, and means operable relative to said holding means in predetermined timed relation to the movements thereof and embodying a female die for shaping the edge portions of the blank without said holding means.

2. In a drawing press, a work blank supporting part, means for adjusting said part, and means for coacting with said part to firmly grip the central portion of the blank and leave its edges free for shaping.

3. In a drawing press, a stationary bed part, work supporting means mounted on said bed part, means disposed above said supporting part and operable to move into position to coact with said part to grip an interposed work blank in spaced relation to a part thereof to be subsequently shaped and then to dwell in its work gripping position, and means automatically operable during the dwell of said first means to shape the portion of an engaged blank which is disposed without said first means and work supporting part.

4. In a drawing press, a pair of relatively movable work gripping parts, means for moving one of said parts into work gripping engagement with the other and then to cause it to have a predetermined dwell before releasing the work, and means embodying a female die automatically operable to have movements in predetermined timed relation to the movements of said work gripping parts and to act on and shape the edge of a work piece clamped by said parts during the said period of dwell of the movable part.

5. In a drawing press, a work supporting part, a pair of relatively movable slides, one having a part for coacting with the work support to centrally grip the work and the other having a female work shaping part, and mechanism connecting said slides and operable to impart differential movements in predetermined order thereto for imparting respective work gripping and shaping movements thereto.

6. In a drawing press, a work supporting part, means operable to move a part thereof into work gripping coaction with said supporting part and then to remain at rest a predetermined period before releasing the work, and means having a shaping part which is automatically movable relative to said work gripping parts and operable during the period of rest of the movable gripping part to act on and shape the edge portions of the work without the point of gripping of the same.

7. In a drawing press, a stationary work supporting part which is smaller than the work to be acted on, means for vertically adjusting said part, means having a work clamping part movable to clamp a work piece to said supporting part, and means reciprocally movable relative to said work holding parts and operable to act on and shape the engaged work piece without the point of engagement of the same by the holding parts.

8. In a drawing press, a stationary frame part, a work supporting part mounted thereon, means interposed between said parts and operable to relatively adjust the same, a work gripping member reciprocally movable in opposition to said work supporting part and operable to coöperate with said supporting part to grip a work piece thereto, and means having a part which is reciprocally movable relative to said work supporting part and member and operable to coact with and shape the outer edge portion of a work piece held by said supporting part and member.

9. In a drawing press, a crank shaft, a toggle mechanism operated by said crank shaft, a stationary work supporting part, a reciprocally movable member having connection with and operable by said toggle mechanism to clamp a work piece to said supporting part, then to dwell a predetermined period in such clamping position, and then to release the work, all in a single revolution of the crank shaft, and means operable by the crank shaft to shape the edge portion of a work piece while clamped to said supporting part.

10. In a drawing press, a stationary work support, a part movable into and out of work gripping coaction with said support, a work shaping member movable without both said support and part, and mechanism operable to reciprocally move both said part and member relative to said support, the part being moved into work gripping coaction with said support and then standing at rest during the work shaping movement of said member.

11. In a drawing press, a stationary work support, a part movable into and out of work gripping coaction with said support, a work shaping member movable without both said support and part, and mechanism operable to reciprocally move both said part and member relative to said support, the part being moved into work gripping coaction with said support and then standing at rest during the work shaping and initial retracting movements of said member.

12. In a drawing press, a stationary work holding part, a movable work holding part, means operable to move said movable part into work holding relation to said stationary part, then to dwell a predetermined period in such holding position and then to recede from the stationary part, and means having a matrix work shaping member automatically operable to act on and shape the work piece without said holding parts during the period of dwell of said movable part.

13. In a drawing press, opposed work holding parts, means operable to relatively move said parts into and out of work holding position and to have a prolonged dwell in work holding position, and means automatically operable to act on and shape the work without the point of engagement thereof by said holding parts and during the period of work holding dwell thereof.

14. In a drawing press, opposed work holding parts, means normally retaining one of said parts in spaced relation to its companion and operable to move said part into work holding relation to its companion, then to have a predetermined dwell of prolonged duration, and then to return to normal position, and means having a reciprocally movable work shaping part automatically operable to act on and shape the work without its point of engagement by said parts and during the period of work holding dwell thereof.

15. In a drawing press, opposed work holding parts, means for adjusting one of said parts with respect to the other, means normally retaining the other of said parts in spaced relation to its companion and operable to move said part into work holding relation to its companion, then to have a predetermined dwell of prolonged duration, and then to return to normal position, and means having a reciprocally movable work shaping part automatically operable to act on and shape the work without its point of engagement by said parts and during the period of work holding dwell thereof.

16. In a drawing press, a work support, means for adjusting said support, a work holding part, means operable to move said part into work holding relation to said support, then to have a predetermined dwell in such relation and then to recede from work holding position, and means automatically operable in timed relation to said first means to act on a work piece without and in embracing relation to said support and part to shape the work piece during the period of work holding dwell of said part.

17. In a drawing press, a slide member, worm wheels carried in peripherally opposed relation by said slide member, stems threaded through said worm wheels, means carrying said stems in pendant relation and operable to impart predetermined reciprocatory movements thereto, a shaft journaled in said slide and having a worm interposed between and in mesh with said opposed worm wheels, whereby a turning of the shaft effects a turning of the wheels in threaded engagement with said stems, and a motor carried by said slide member and operatively connected to said shaft to drive the same.

18. In a drawing press, a frame having a fixed bed part, a plurality of upper and lower slides guided for vertical reciprocatory movements by said frame, the lower slide having a matrix carrying part above said bed part, a matrix carried by said lower slide, a plurality of pins projecting upward from said bed through the upper portion of said lower slide and into said matrix, a blank supporting pad mounted on said pins and adapted for movements within said matrix when the lower slide is raised, a male die carried by the upper slide for coaction with said pad to clamp a work blank thereto, and mechanism operable to impart respective movements to said slides, whereby the male die is caused to clamp and hold the work in coaction with said pad when the matrix is being moved to shape the work without the male die.

19. In a drawing press, a frame, having a fixed bed part, a plurality of upper and lower slides guided for vertical reciprocatory movements by said frame, the lower slide having a matrix carrying part above said bed part, a matrix carried by said lower slide, a plurality of pins projecting upward from said bed through the upper portion of said lower slide and into said matrix, a blank supporting pad mounted on said pins and adapted for movements within said matrix when the lower slide is raised, a male die carried by the upper slide for coaction with said pad to clamp a work blank thereto, mechanism operable to impart respective movements to said slides, whereby the male die is caused to clamp and hold the work in coaction with said pad when the matrix is being moved to shape the work without the male die, and means for vertically adjusting said pins with respect to said bed part.

In testimony whereof, I have hereunto signed by name to this specification.

HENRY J. HINDE.